US008320936B2

(12) United States Patent
Reitsma

(10) Patent No.: US 8,320,936 B2
(45) Date of Patent: Nov. 27, 2012

(54) POSITIONING IN A MOBILE COMMUNICATIONS SYSTEM

(75) Inventor: Erik Reitsma, Zoetermeer (NL)

(73) Assignee: Telefonaktiebolaget ELM Ericsson (publ), Stockholm (SE)

( * ) Notice: Subject to any disclaimer, the term of this patent is extended or adjusted under 35 U.S.C. 154(b) by 728 days.

(21) Appl. No.: 11/915,719

(22) PCT Filed: May 31, 2005

(86) PCT No.: PCT/EP2005/005903
§ 371 (c)(1),
(2), (4) Date: Jan. 31, 2011

(87) PCT Pub. No.: WO2006/128484
PCT Pub. Date: Dec. 7, 2006

(65) Prior Publication Data
US 2011/0117922 A1  May 19, 2011

(51) Int. Cl.
*H04W 24/00* (2009.01)

(52) U.S. Cl. .............. 455/456.1; 455/456.2; 455/456.3; 455/456.5; 455/456.6; 455/550.1

(58) Field of Classification Search ............... 455/414.2, 455/421, 435.1, 440, 444, 456.1, 456.3; 701/225, 701/300
See application file for complete search history.

(56) References Cited

U.S. PATENT DOCUMENTS

| | | | |
|---|---|---|---|
| 5,289,163 A * | 2/1994 | Perez et al. | 340/539.32 |
| 6,618,593 B1 * | 9/2003 | Drutman et al. | 455/456.3 |
| 2003/0063003 A1 * | 4/2003 | Bero et al. | 340/573.1 |
| 2004/0132461 A1 * | 7/2004 | Duncan | 455/456.1 |
| 2004/0156326 A1 * | 8/2004 | Chithambaram | 370/310 |
| 2005/0280546 A1 * | 12/2005 | Ganley et al. | 340/573.4 |

* cited by examiner

*Primary Examiner* — Kathy Wang-Hurst

(57) ABSTRACT

A method in a mobile communication system for determining a distance between a first mobile terminal and a second mobile terminal. Based on a trigger distance between the first and the second mobile terminal, a triggered location server defines an area surrounding the first mobile terminal and optionally defines an area surrounding the second mobile terminal. The trigger distance may be provided by an application e.g. for providing a location based service. If the first mobile terminal determines that it has moved outside of its area, it sends a trigger to the triggered location server. If the trigger distance between the first and the second mobile terminal is reached, the triggered location server may report this to the application as an event.

22 Claims, 6 Drawing Sheets

POSITIONING IN A MOBILE COMMUNICATIONS SYSTEM

BACKGROUND OF THE INVENTION

1. Technical Field of the Invention

The invention relates to determining position information of a mobile terminal in a mobile communications system.

2. Description of Related Art

A number of (end-user) applications require a fairly accurate physical position of the end-user. An example of such an application is a location-based service, wherein a service is provided to a mobile terminal user, dependent of the geographical position of the mobile terminal. In a mobile communication system such as the Global System for Mobile Communications (GSM) the position of a mobile terminal may be determined by measuring the distance to several Radio Base Stations (RBSs). This requires measurement by one or more RBS. A lot of messaging in the network in relation with these measurements may be unnecessary. The reason for this is that an RBS is not able to establish independently whether a mobile terminal is moving or not. Therefore there is a chance that a position is measured of a non-moving mobile terminal. Depending on the intervals between a first and a second measurement, the unnecessary load on the network will increase. For example patent application WO03/065698 aims at reducing unnecessary measurements by the RBS by having a mobile terminal determining its own location and sending a trigger when a predetermined area is entered. The positioning by the mobile terminal is done using e.g. positioning systems to be used by the mobile terminal itself. One example of such a positioning system is Global Positioning System (GPS).

WO03/065698 further proposes a monitoring engine that monitors the location of the mobile terminal and of other contacts specified in associations, and checks for the user-specified trigger-events. This feature is split out into a proximity server, which is an operating system platform feature. A proximity server makes use of whatever location technologies and quality criteria are available on the phone. The proximity server has 2D and 3D geometry calculation engines that carry out and optimise the calculations necessary for checking for trigger-events. A mobile terminal may register its trigger events at the proximity server. Trigger events may be described in terms of named landmarks or as geometrical areas. The Mobile terminal may receive notifications in return when the trigger event is detected.

Current solutions provide for a trigger whenever one mobile terminal moves relative to a fixed object or area. There is no method or system for initiating triggers when a first moving mobile terminal is in the proximity of a second moving mobile terminal, of which the movement and/or direction is unknown to the first mobile terminal.

SUMMARY OF THE INVENTION

The present invention deals with the aforementioned problem by providing a method and a system in a mobile communication system for determining a distance between a first mobile terminal and a second mobile terminal. Based on a trigger distance between the first and the second mobile terminal, a triggered location server defines an area surrounding the first mobile terminal and optionally defines an area surrounding the second mobile terminal. The trigger distance may be provided by an application e.g. for providing a location based service. If the first mobile terminal determines that it has moved outside of its area, it sends a trigger to the triggered location server. If the trigger distance between the first and the second mobile terminal is reached, the triggered location server may report this to the application as an event.

In a first aspect of the invention a method is provided in a mobile communication system for determining a distance between a first mobile terminal 101 and a second mobile terminal 102, said method comprising the step of:

setting a trigger distance 203 between said first mobile terminal 101 and said second mobile terminal 102;

characterised in that the method further comprises the steps of:

a. determining a first position 201, comprising a position of said first mobile terminal 101;

b. determining a second position 202, comprising a position of said second mobile terminal 102;

c. a triggered location server 104 defining a first geographical area 206,306,406,506 surrounding said first position 201 in such a way that each point of said first area 206,306,406,506 has at least said trigger distance to said second position 202;

d. said triggered location server 104 sending information in relation to said first area 206,306,406,506 to said first mobile terminal 101;

e. said first mobile terminal 101 sending a trigger to said triggered location server 104 in case said first mobile terminal 101 has determined that its current position is outside of said first area 206,306,406,506.

A further embodiment of the invention provides for a method wherein step "c" further comprises defining a second geographical area 207,307,407,507 surrounding said second position 202 in such a way that each point of said first area 206,306,406,506 has at least said trigger distance 203 to any point of said second area 207,307,407,507.

A further embodiment of the invention provides for a method, wherein steps "a"-"e" are repeated after said first mobile terminal 101 sending said trigger.

A further embodiment of the invention provides for a method, wherein said trigger distance 203 is a minimum trigger distance.

A further embodiment of the invention provides for a method, wherein said first area 206,306,406,506 comprises substantially a circle with its centre substantially at said first position.

A further embodiment of the invention provides for a method, wherein step "c" further comprises defining said second area 207,307,407,507 in such a way that said second area 207,307,407,507 measures substantially the same as said first area 206,306,406,506.

A further embodiment of the invention provides for a method, wherein step "c" further comprises defining said first area 506 dependent on the movement behaviour or the expected constraints in movement of said first mobile terminal 101.

A further embodiment of the invention provides for a method, wherein in step "e" said first mobile terminal 101 only sends a trigger if said first mobile terminal 101 has previously sent a trigger at a minimum time interval before.

A further embodiment of the invention provides for a method, wherein said trigger includes information in relation to said current position of said first mobile terminal 101.

A further embodiment of the invention provides for a method, wherein said first mobile terminal 101 determines its current position by means of a Global Positioning System.

A further embodiment of the invention provides for a method, wherein said trigger distance 203 is a maximum distance.

A further embodiment of the invention provides for a method, wherein in step "a" a location server determines said first position 201 and provides said first position 201 to said triggered location server 104.

A further embodiment of the invention provides for a method, wherein in step "b" a location server determines said second position 202 and provides said first position 202 to said triggered location server 104.

In a second aspect of the invention a system is provided in a mobile communication system for determining a distance between a first mobile terminal 101 and a second mobile terminal 102, said system arranged for:

setting a trigger distance 203 between said first mobile terminal 101 and said second mobile terminal 102;

characterised in that said system further comprises:

a location server 103 arranged for determining a first position 201, comprising a position of said first mobile terminal 101;

said location server 103 arranged for determining a second position 202, comprising a position of said second mobile terminal 102;

said location server arranged for providing said first position 201 to a triggered location server 104;

said location server arranged for providing 103 said second position 202 to said triggered location server 104;

said triggered location server 104 arranged for defining a first geographical area 206,306,406,506 surrounding said first position 201 in such a way that each point of said first area 206,306,406,506 has at least said trigger distance 203 to said second position 202;

said triggered location server 104 arranged for sending information in relation to said first area 206,306,406,506 to said first mobile terminal 101;

said first mobile terminal 101 arranged for sending a trigger to the triggered location server 104 in case said first mobile terminal 101 has determined that its current position is outside of said first area 206,306,406,506.

A further embodiment of the invention provides for a system, wherein said triggered location server 104 is further arranged for defining a second geographical area 207,307, 407,507 surrounding a second position 202 in such a way that each point of said first area 206,306,406,506 has at least said trigger distance 203 to any point of said second area 207,307, 407,507.

A further embodiment of the invention provides for a system, wherein said location server 103 is co-located with the triggered location server 104.

A further embodiment of the invention provides for a system, wherein the location server 103 is a Mobile Positioning Server.

In a third aspect of the invention a mobile terminal 101,102 for operating in the invented system is provided.

In a fourth aspect of the invention a triggered location server 104 for operating in the invented system is provided.

In a fifth aspect of the invention a computer program comprising program instructions for causing a computer to perform the method of the invention is provided.

In a sixth aspect of the invention a computer program is provided on a carrier and comprising computer executable instructions for causing a computer to perform the method of the invention.

A further embodiment of the invention provides for a computer program, wherein said carrier is a record medium, computer memory, read-only memory or an electrical carrier signal.

Basic functionalities of the present invention comprise a network function and a mobile terminal function. Both are described below.

The network function contains the following capabilities:
Handling of requests from applications;
Communication channel to mobile terminals that contain the triggered location function;
Receiving movement event from the mobile terminals and forwarding these to the applications;

One example of a network node responsible for mobile terminal position reporting is called Mobile Positioning Server (MPS). This server may be extended with the triggered location capability.

The mobile terminal function contains the following capabilities:
Access to mobile terminal position information, this may be provided by a positioning system such as GPS;
Storage of at least one distance value;
Storing of a starting position, and acquiring current position information, which is used to calculate a moved distance;
A communication function towards a triggered location server, which may be co-located at an MPS.

DETAILED DESCRIPTION OF THE DRAWINGS

Figure 1:
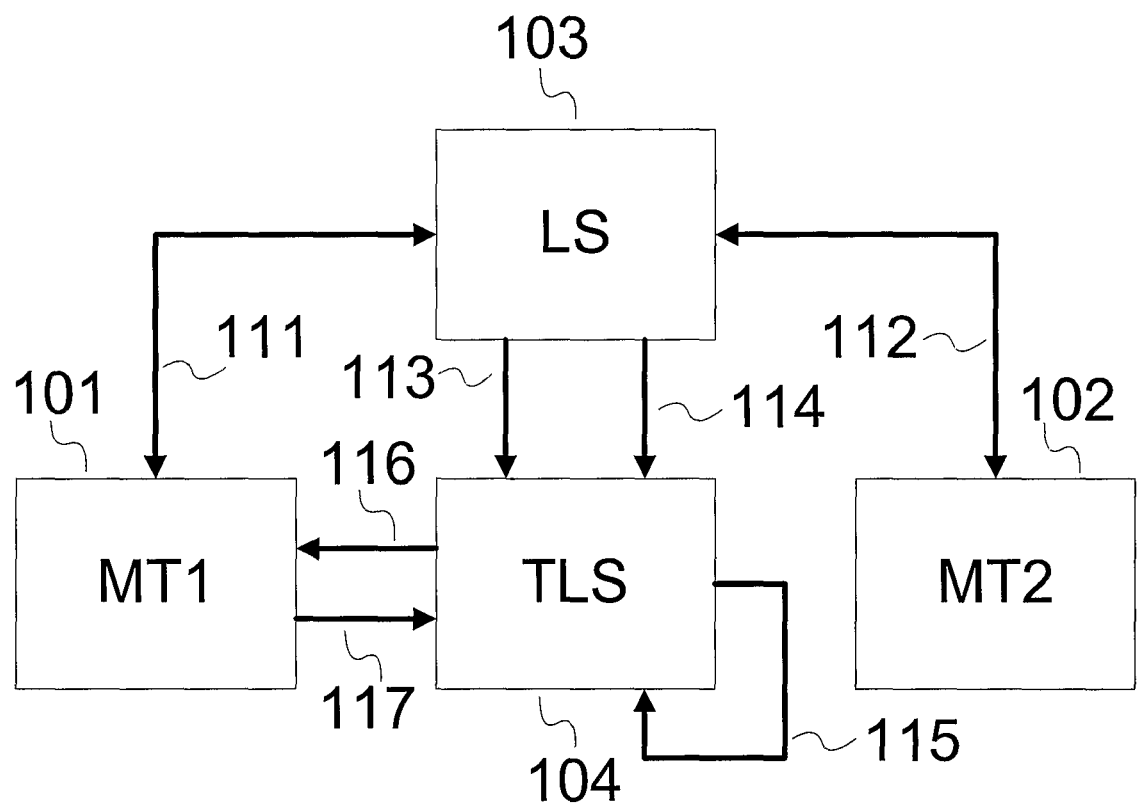
FIG. 1 shows a general concept of the present invention.

FIG. 1 shows an embodiment of the method of the invention and a schematic overview of the system elements according to the invention. The figure is describes establishing of areas surrounding two mobile terminals and communicating of information between these system elements.

Figure 2:
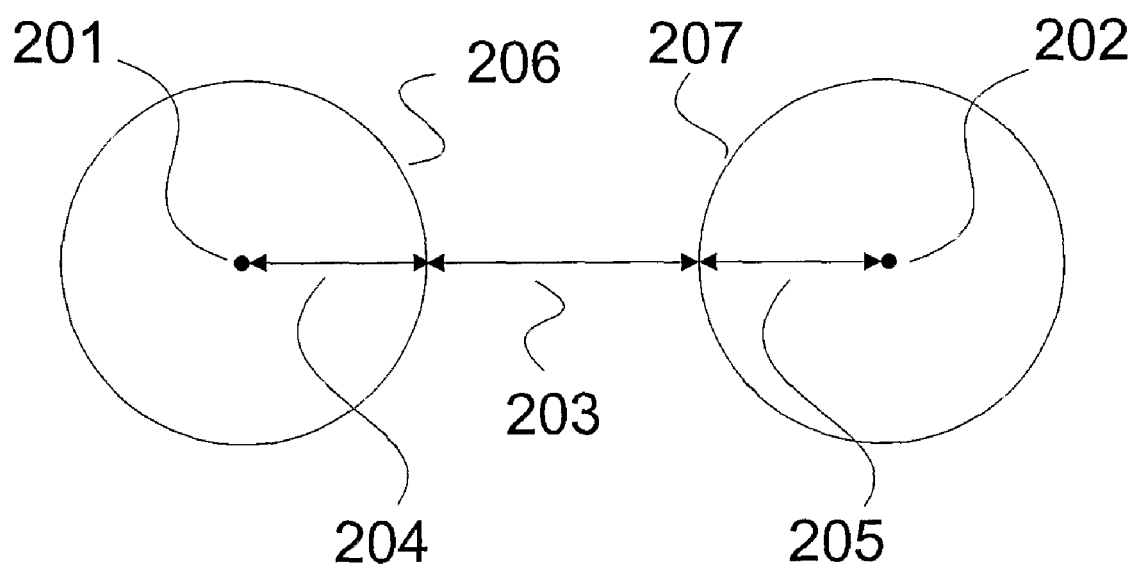
FIG. 2 shows how geographical areas may be set.

FIG. 2 shows an embodiment with graphic representation of the areas.

In the described method according to FIG. 1, the method starts off with setting a trigger distance (203) between said first mobile terminal (101) and said second mobile terminal (102), which is not shown. Shown are next steps, with reference to FIG. 2 for the graphical representation of the position and areas of the mobile terminals:

Step 111 a Location Server 103 determines a first position 201, comprising a position of said first mobile terminal 101.

Step 112 the Location Server determines a second position 202, comprising a position of said second mobile terminal 102.

Step 113 the Location Server 103 provides said first position 201 to said triggered location server 104.

Step 114 the Location Server 103 provides said first position 201 to said triggered location server 104.

Step 115 the triggered location server 104 defines a first geographical area 206 surrounding said first position 201 and a second geographical area 207 surrounding said second position 202 in such a way that each point of said first area 206 has at least said trigger distance to any point of said second area 207.

Step 116 the triggered location server 104 sends information in relation to said first area 206 to said first mobile terminal 101.

Step 117 the first mobile terminal 101 sends a trigger to said triggered location server 104 in case said first mobile terminal 101 has determined that its current position is outside of said first area 206.

The drawings 3 to 5 show possible embodiments for establishing trigger areas surrounding two mobile terminals. Choosing different areas may further reduce the expected number of triggers and therefore the network load.

Figure 3:
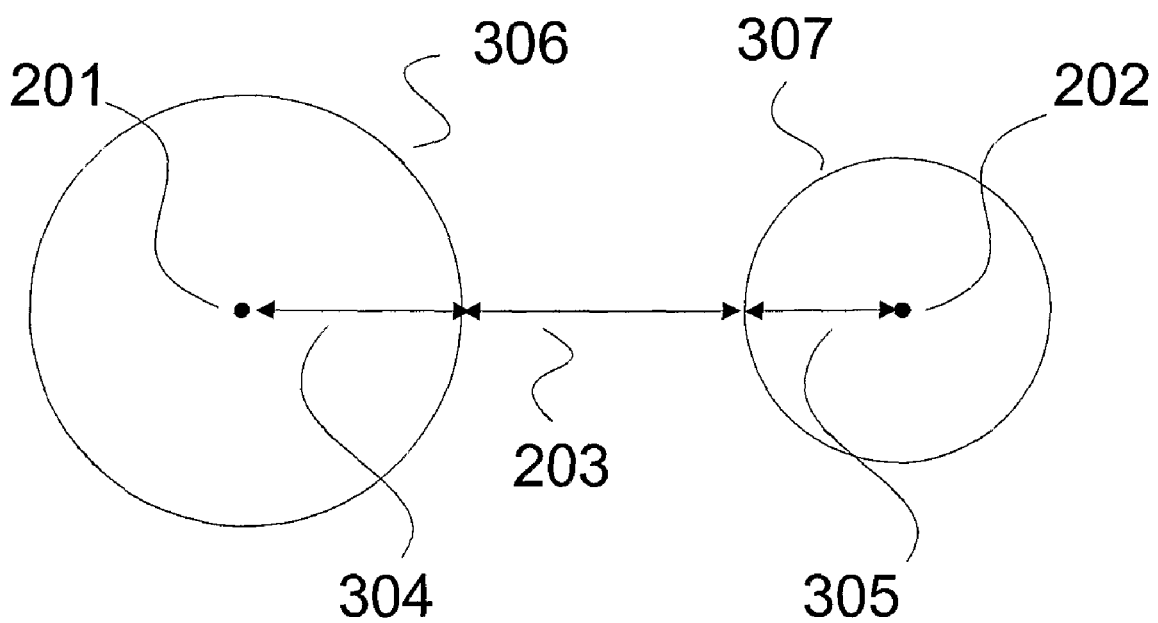
FIG. 3 shows a possible embodiment of the invention, with asymmetrical areas for MT1 and MT2.

FIG. 3 shows a possible embodiment of the invention, with asymmetrical areas 306, 307 for surrounding the position 201 of MT1 and the position 202 MT2. Radius R1 304 for MT1 is set larger than radius R2 305 for MT2. This may be appropriate if MT1 moves faster than MT2, or if it is expected that MT1 will move faster than M2. R1 304 and R2 305 are set in such a way that R1+R2=d−D, wherein d is the trigger distance 203 and D is the actual distance between MT1 and MT2. Because the fastest-moving mobile terminal MT1 has now more space to move before the conditions for a trigger are satisfied, the expected duration until the next event is longer, and therefore the expected or average number of trigger indications is reduced, therefore reducing the network load.

Figure 4:
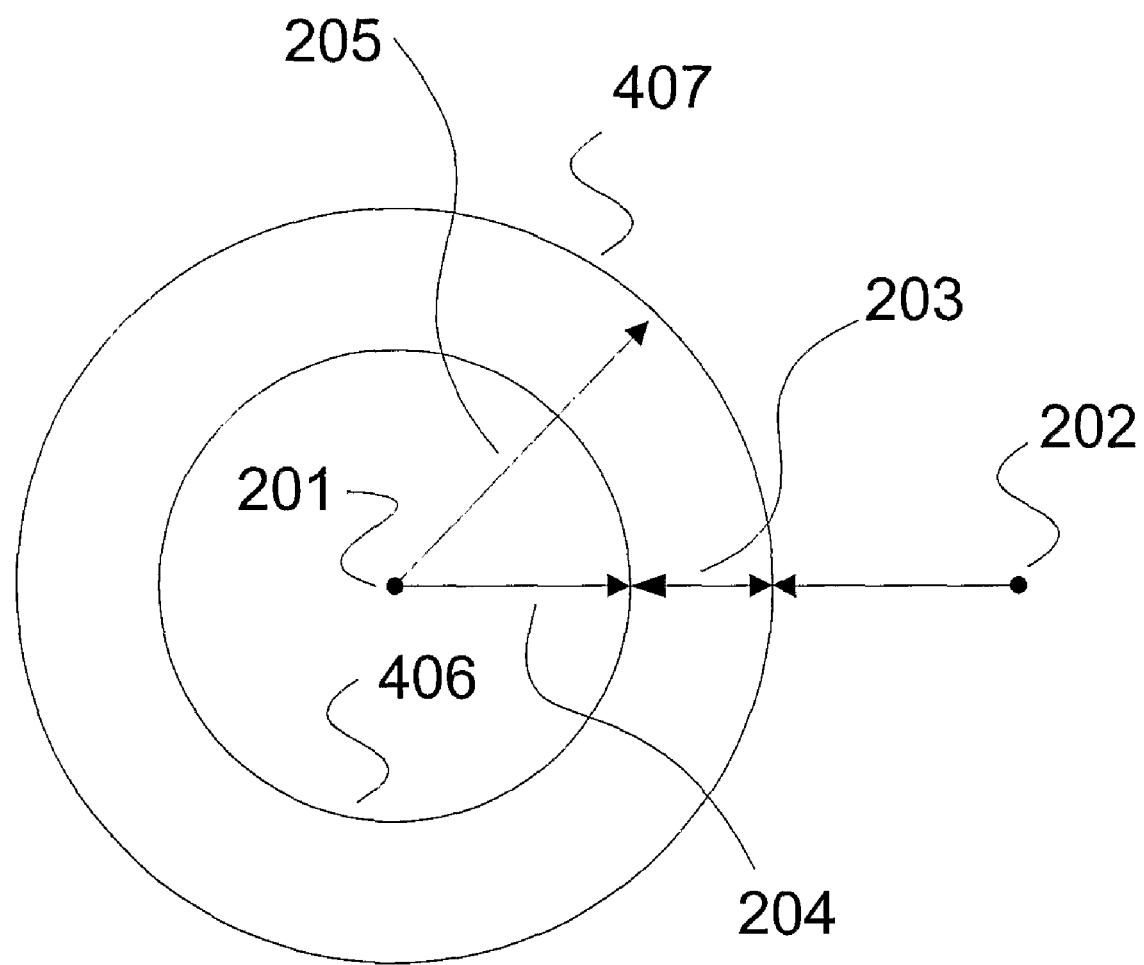
FIG. 4 shows a possible embodiment of the invention with two concentric areas for MT1 and MT2.

FIG. 4 shows a possible embodiment of the invention with two concentric areas for MT1 and MT2. Two concentric circles 406, 407 with the position 201 of mobile terminal MT1 as the common centre. MT1 sends a trigger when leaving the area within the inner circle. MT2 on position 202 sends a trigger entering the area within the outer circle. Inner radius R1 204 and outer radius R2 205 are set in such a way that R2−R1=D. R1 204 may be chosen such that R1=(d−D)/2 (d being trigger distance 203) as earlier, but if MT1 and MT2 move similarly, it is more efficient to choose R1 204 larger than (d−D)/2.

Figure 5:
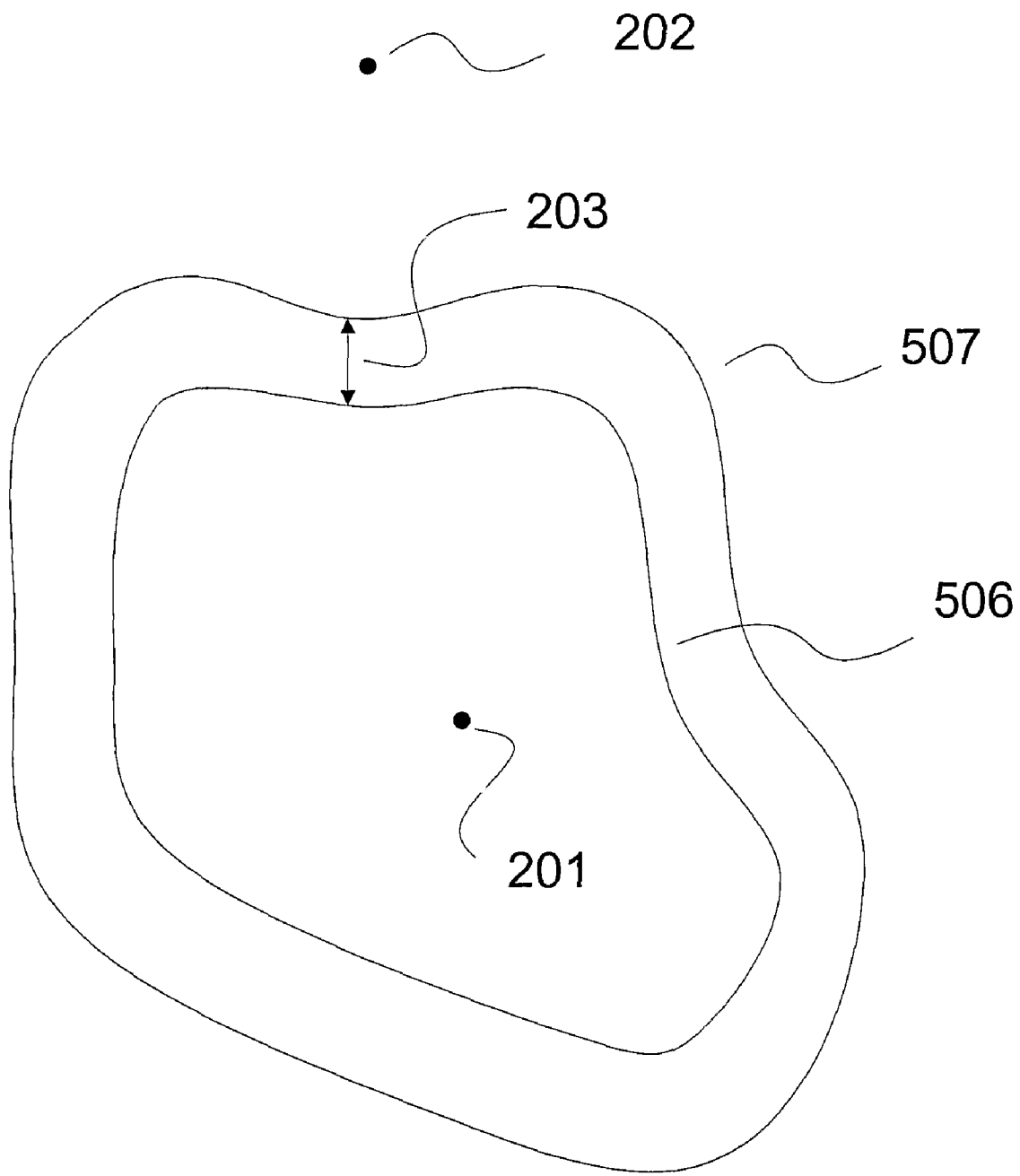
FIG. 5 shows a possible embodiment with non-circular areas for the triggers.

FIG. 5 shows a possible embodiment with non-circular areas 506, 507 for the triggers. The areas may take any form, which fits the situation, best. The first geographical area 506 surrounding said first position 201 and a second geographical area 507 surrounding said second position 202 are defined in such a way that each point of said first area 506 has at least a trigger distance 203 to any point of said second area 507.

The optimal shape of the area may for example depend on the movement behaviour of MT1 at position 201 and MT2 at position 202. This movement behaviour may be measured by MT1 and MT2 and sent together with the trigger event indications to the TLS. The shape may for example follow the outlines of (natural) barriers such as a lake. As soon as MT2 leaves the water, it will send a trigger. In another example (not illustrated with a drawing) the shape may follow the direction of a motorway on which MT1 moves. The shape of the area may in this case depend on the expected constraint in the movements of MT1. MT1 will in this case send a trigger as soon as it leaves the motorway.

Figure 6:
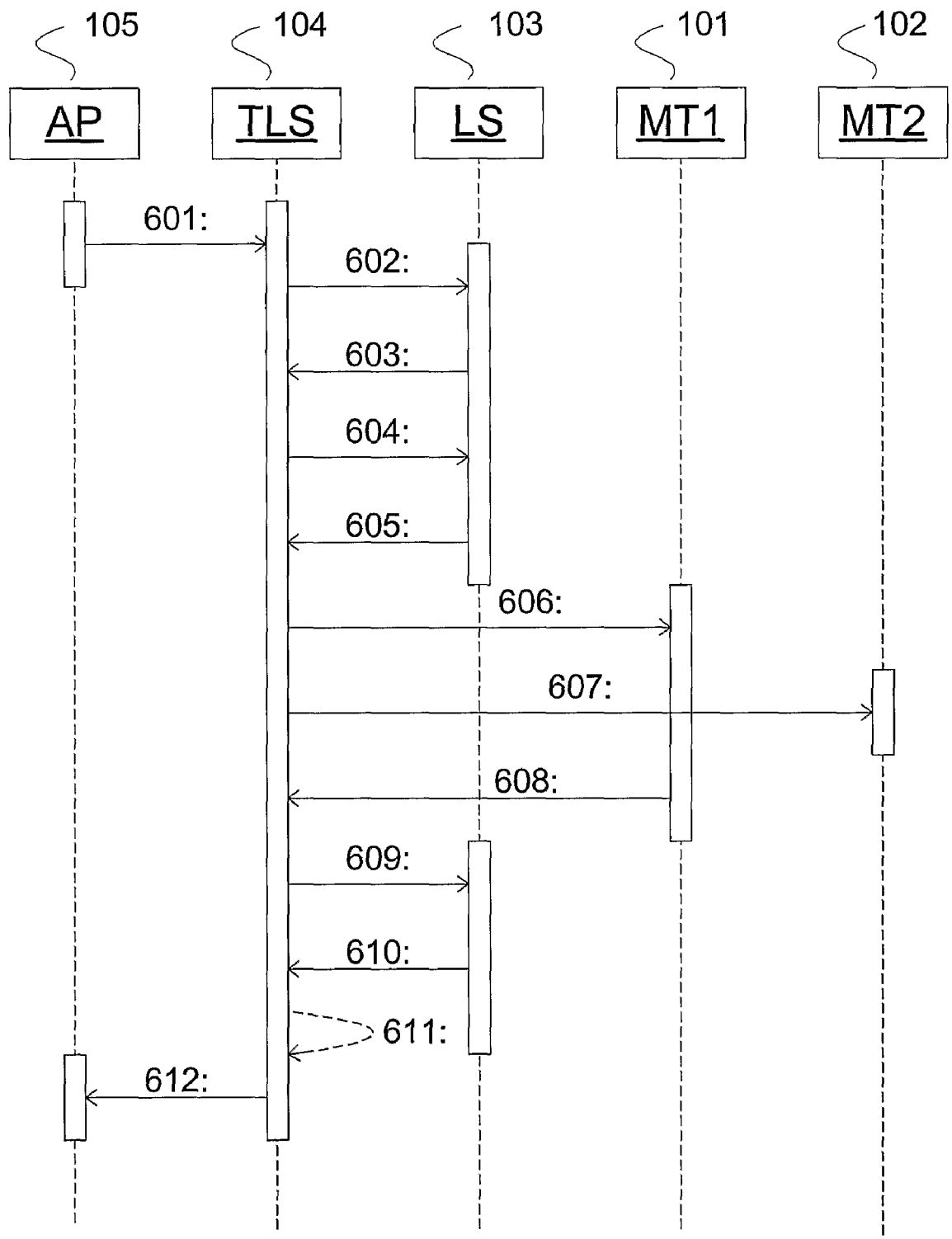
FIG. 6 shows an example diagram of interaction between various elements of a mobile communication system

FIG. 6 shows an example diagram of interaction between various elements of a mobile communication system, which may be involved in executing the method of the present invention. The elements have been abbreviated as follows:

MT1 101=Mobile Terminal 1;
MT2 102=Mobile Terminal 2;
AP 105=APplication;
LS 103=Location Server;
TLS 104=Triggered Location Server.

Next method may be followed if an Application 105 (AP) wishes to be informed when the distance between MT1 101 and MT2 102 has become less than Distance (D).

Step 601 AP 05 sends a request for a trigger for this condition to TLS 104.

Step 602 TLS 104 sends a request for the current location of MT1 101 to LS 103.

Step 603 LS 103 sends the current location of MT1 101 to TLS 104 as a response to the request.

Step 604 TLS 104 sends a request for the current location of MT2 102 to LS 103.

Step 605 LS 103 sends the current location of MT2 102 to TLS 104 as a response to the request.

Using the invention, steps 602, 603, 604, 605 are done once when the trigger is set. TLS 104 calculates the actual distance (d) between MT1 101 and MT2 102. If the distance (d) is smaller than Distance (D) step 612 follows. Else TLS 104 calculates a first area, comprising e.g. a circle. Radius (R) of the circle comprising half of the difference between d and D, according to the formula R=(d−D)/2. The centre of the circle comprises the last known location of MT1 101. TLS 104 calculates a second circle for MT2 102, wherein the centre of the circle comprises the last known location of MT2 102. FIG. 2 shows how the circles are situated. The steps continue:

Step 606 TLS 104 requests MT1 101 to send a trigger as soon as MT1 101 is outside the first area.

Step 607 TLS 104 requests MT2 102 to send a trigger as soon as MT2 102 is outside the second area.

Step 608 Immediately or after some time the condition for the trigger for MT1 101 or for MT2 102 is satisfied. Suppose the condition for the trigger for MT1 101 is satisfied first. (In the following steps MT1 101 is replaced by MT2 102 and vice versa if the condition for MT2 102 is satisfied first). MT1 101 sends an indication to TLS 104.

Step 609 TLS 104 sends a request for the location of MT2 104 to LS 103.

Step 610 LS 103 sends the location of MT2 102 to TLS 104.

Step 611 Optionally: wait a short time (e.g. 3 seconds) and continue at step 6.

Step 612 TLS 104 sends an indication to AP 105 that MT1 101 and MT2 102 are less than D apart.

If MT1 101 and MT2 102 are still far apart, or if both terminals move very little, they have large trigger areas (R is very large) and MT1 101 may send a trigger after hours, days, or even longer. All that time there is no communication going on. Only when MT1 101 or MT2 102 has moved more than R from its location in step 606 will there be new communication.

When (finally) in step 608 the trigger is sent, there is some communication again in steps 608, 609, 610, 611, 606.

In step 611 it is preferred to wait a short time, because if there would not be any delay, one mobile terminal moving towards another non-moving mobile terminal would generate infinitely many indications. The following example illustrates this situation. Suppose D=100 and MT1 101 is moving towards MT2 102 in a straight line, starting 200 apart. In the following table each row represents the distance d between MT1 101 and MT2 102 and values for R as calculated in step 606 of the above sequence. An indication is sent when MT1 101 has moved R towards MT2 102, so at each next row the distance between MT1 101 and MT2 102 is the previous distance minus the last R. So, if d[i] is the distance between MT1 101 and MT2 102 at the ith event, and R[i] is the calculated R at the ith event, R[i]=(d[I]−D)/2. At each new event the distance between MT1 101 and MT2 102 has decreased with R[I], because MT1 101 has moved to where its conditions have met. So, d[i]=di−1−Ri−1. Filling in R[i]=(d

[i]−D)/2 in d[i]=d[i]−1−R[i−1] results in d[i]=d[i]−1−(d[i]−1−D)/2=(d[i]−1+D)/2. This means that d[i]>D for all i and therefore for all events, and there are infinitely many events before MT1 101 and MT2 102 are less than D apart. The following table shows that the time between events, if MT1 101 is moving at a constant speed, is cut in half for each event.

| D | R = (d − D)/2 | Time since last event if the speed is 1 |
|---|---|---|
| 200 | (200 − 100)/2 = 50 | — |
| 200 − 50 = 150 | (150 − 100)/2 = 25 | 50 |
| 150 − 25 = 125 | (125 − 100)/2 = 12.5 | 25 |
| 125 − 12.5 = 112.5 | (112.5 − 100)/2 = 6.25 | 12.5 |
| 112.5 − 6.25 = 106.25 | (106.25 − 100)/2 = 3.125 | 6.25 |
| Etc. | Etc. | Etc. |

If however the new triggers are not set immediately, the time between events has a lower limit, and the amount of events is finite. This reduces the accuracy of the time of the event, but the accuracy may be sacrificed for a better efficiency.

What is claimed is:

1. A method in a mobile communication system for determining a distance between a first mobile terminal and a second mobile terminal, said method comprising the steps of:
   setting a trigger distance between said first mobile terminal and said second mobile terminal;
   a. determining a first position, comprising a position of said first mobile terminal;
   b. determining a second position, comprising a position of said second mobile terminal;
   c. a triggered location server defining a first geographical area surrounding said first position in such a way that each point of said first area has at least said trigger distance to said second position;
   d. said triggered location server sending information in relation to said first area to said first mobile terminal;
   e. said first mobile terminal sending a trigger to said triggered location server in case said first mobile terminal has determined that its current position is outside of said first area.

2. The method according to claim 1, wherein step "c" further comprises defining a second geographical area surrounding said second position in such a way that each point of said first area has at least said trigger distance to any point of said second area.

3. The method according to claim 1, wherein steps "a" through "e" are repeated after said first mobile terminal sending said trigger.

4. The method according to claim 1, wherein said trigger distance is a minimum trigger distance.

5. The method according to claim 1, wherein said first area comprises substantially a circle with its centre substantially at said first position.

6. The method according to claim 2, wherein step "c" further comprises defining said second area in such a way that said second area measures substantially the same as said first area.

7. The method according to claim 1, wherein step "c" further comprises defining said first area dependent on the movement behaviour or the expected constraints in movement of said first mobile terminal.

8. The method according to claim 1, wherein in step "e" said first mobile terminal only sends a trigger if said first mobile terminal has previously sent a trigger at a minimum time interval.

9. The method according to claim 1, wherein said trigger includes information in relation to said current position of said first mobile terminal.

10. The method according to claim 1, wherein said first mobile terminal determines its current position by means of a Global Positioning System.

11. The method according to claim 1, wherein said trigger distance is a maximum distance.

12. The method according to claim 1, wherein in step "a" a location server determines said first position and provides said first position to said triggered location server.

13. The method according to claim 1, wherein in step "b" a location server determines said second position and provides said first position to said triggered location server.

14. A system in a mobile communication system for determining a distance between a first mobile terminal and a second mobile terminal, said system comprising:
   means for setting a trigger distance between said first mobile terminal and said second mobile terminal;
   a location server for determining a first position, comprising a position of said first mobile terminal;
   said location server for determining a second position, comprising a position of said second mobile terminal;
   said location server for providing said first position to a triggered location server;
   said location server for providing said second position to said triggered location server;
   said triggered location server for defining a first geographical area surrounding said first position in such a way that each point of said first area has at least said trigger distance to said second position;
   said triggered location server for sending information in relation to said first area to said first mobile terminal;
   said first mobile terminal for sending a trigger to the triggered location server in case said first mobile terminal has determined that its current position is outside of said first area.

15. The system according to claim 14, wherein said triggered location server is further arranged for defining a second geographical area surrounding a second position in such a way that each point of said first area has at least said trigger distance to any point of said second area.

16. The system according to claim 14, wherein said location server is co-located with the triggered location server.

17. The system according to claim 14, wherein the location server is a Mobile Positioning Server.

18. A mobile terminal in a mobile communication system for determining a distance between a first mobile terminal and a second mobile terminal, said mobile terminal comprising:
   means for setting a trigger distance between said first mobile terminal and said second mobile terminal;
   a location server for determining a first position, comprising a position of said first mobile terminal;
   said location server for determining a second position, comprising a position of said second mobile terminal;
   said location server for providing said first position to a triggered location server;
   said location server for providing said second position to said triggered location server;
   said triggered location server for defining a first geographical area surrounding said first position in such a way that each point of said first area has at least said trigger distance to said second position;

said triggered location server for sending information in relation to said first area to said first mobile terminal;

said first mobile terminal for sending a trigger to the triggered location server in case said first mobile terminal has determined that its current position is outside of said first area.

19. A triggered location server for determining a distance between a first mobile terminal and a second mobile in a mobile communication system, the triggered location server comprising:

means for receiving, from a location server, a first position that comprises a position of a first mobile terminal and for receiving from the location serve a second position that comprises a position of a second mobile terminal;

means for defining a first geographical area surrounding said first position in such a way that each point of said first area has at least said trigger distance to said second position;

means for sending information in relation to said first area to said first mobile terminal;

means for receiving a trigger in case said first mobile terminal has determined that its current position is outside of said first area.

20. The triggered location server according to claim 19, wherein said triggered location server further comprises means for defining a second geographical area surrounding a second position in such a way that each point of said first area has at least said trigger distance to any point of said second area.

21. The triggered location server according to claim 19, wherein said location server is co-located with the triggered location server.

22. The triggered location server according to claim 19 wherein the location server is a Mobile Positioning Server.

* * * * *

UNITED STATES PATENT AND TRADEMARK OFFICE
CERTIFICATE OF CORRECTION

PATENT NO. : 8,320,936 B2  
APPLICATION NO. : 11/915719  
DATED : November 27, 2012  
INVENTOR(S) : Reitsma Page 1 of 1

It is certified that error appears in the above-identified patent and that said Letters Patent is hereby corrected as shown below:

On the Face Page, in Field (73), under "Assignee", in Column 1, Line 1, delete "ELM Bricsson" and insert -- LM Ericsson --, therefor.

In Column 4, Line 37, delete "system" and insert -- system. --, therefor.

In Column 5, Line 65, delete "APplication;" and insert -- Application; --, therefor.

In Column 9, Line 13, in Claim 19, delete "serve" and insert -- server --, therefor.

In Column 10, Line 15, in Claim 22, delete "19" and insert -- 19, --, therefor.

Signed and Sealed this  
Fifth Day of March, 2013

Teresa Stanek Rea  
*Acting Director of the United States Patent and Trademark Office*